(12) United States Patent
Lehtimaki et al.

(10) Patent No.: US 11,635,483 B2
(45) Date of Patent: Apr. 25, 2023

(54) AOX MULTIPATH DETECTION

(71) Applicant: Silicon Laboratories Inc., Austin, TX (US)

(72) Inventors: Sauli Johannes Lehtimaki, Nummela (FI); Antonio Torrini, Austin, TX (US); Mika Tapio Länsirinne, Espoo (FI)

(73) Assignee: Silicon Laboratories Inc., Austin, TX (US)

( * ) Notice: Subject to any disclaimer, the term of this patent is extended or adjusted under 35 U.S.C. 154(b) by 31 days.

(21) Appl. No.: 17/347,069

(22) Filed: Jun. 14, 2021

(65) Prior Publication Data

US 2022/0397635 A1 Dec. 15, 2022

(51) Int. Cl.
*G01S 3/02* (2006.01)
*G01S 5/02* (2010.01)
*G01S 5/04* (2006.01)

(52) U.S. Cl.
CPC .......... *G01S 5/0218* (2020.05); *G01S 5/0244* (2020.05); *G01S 5/04* (2013.01); *G01S 3/02* (2013.01)

(58) Field of Classification Search
CPC ........ G01S 5/0218; G01S 5/0244; G01S 5/04; G01S 3/02
USPC .................................. 342/417, 451
See application file for complete search history.

(56) References Cited

U.S. PATENT DOCUMENTS

| | | | |
|---|---|---|---|
| 7,242,350 B1 * | 7/2007 | Pozgay | G01S 3/04 342/417 |
| 7,804,445 B1 | 9/2010 | Fiore | |
| 7,843,388 B2 * | 11/2010 | Shirai | H04L 27/12 370/335 |
| 8,253,622 B2 * | 8/2012 | Hampel | G01S 13/781 342/147 |
| 9,804,256 B2 * | 10/2017 | Jamieson | G01S 5/04 |
| 9,955,943 B2 | 5/2018 | Huang et al. | |
| 9,955,944 B2 | 5/2018 | Huang et al. | |
| 10,327,221 B1 | 6/2019 | Sarrigeorgidis | |
| 10,371,783 B2 * | 8/2019 | Wang | G01S 3/74 |
| 10,440,512 B2 * | 10/2019 | Prevatt | G01S 13/222 |
| 10,466,345 B1 | 11/2019 | Sarrigeorgidis | |
| 11,070,942 B2 * | 7/2021 | Prevatt | G01S 5/14 |
| 11,119,181 B2 * | 9/2021 | Wang | G01S 3/74 |
| 11,143,735 B2 * | 10/2021 | Lehtimaki | H04B 1/713 |

(Continued)

OTHER PUBLICATIONS

Gupta et al., "MUSIC and Improved MUSIC Algorithm to Estimate Direction of Arrival", 2015 IEEE International Conference on Communications and Signal Processing (ICCSP), 2015.

(Continued)

*Primary Examiner* — Chuong P Nguyen
(74) *Attorney, Agent, or Firm* — Nields, Lemack & Frame, LLC

(57) ABSTRACT

A system and method for detecting a multipath environment is disclosed. A first pseudospectrum based on azimuth angle and elevation angle is created. The result of this first pseudospectrum are used to create a second pseudospectrum based on polarization and field ratio. The sharpness of the results for these two pseudospectrums is determined and may be used to detect whether a multipath environment exists. If a multipath environment is believed to exist, the results from this device are ignored in determining the spatial position of the object.

19 Claims, 11 Drawing Sheets

(56) References Cited

U.S. PATENT DOCUMENTS

| | | | |
|---|---|---|---|
| 11,415,657 B2* | 8/2022 | Torrini | G01S 3/043 |
| 2003/0052820 A1 | 3/2003 | Ferreol | |
| 2003/0063029 A1 | 4/2003 | Ferreol et al. | |
| 2007/0147482 A1 | 6/2007 | Shirai et al. | |
| 2008/0266177 A1 | 10/2008 | Chevalier et al. | |
| 2008/0316090 A1 | 12/2008 | Shirakawa | |
| 2009/0015479 A1* | 1/2009 | Thornton | G01S 3/74 |
| | | | 342/417 |
| 2009/0073041 A1 | 3/2009 | Ferreol et al. | |
| 2011/0001659 A1 | 1/2011 | Hempel et al. | |
| 2016/0334498 A1* | 11/2016 | Jamieson | G01S 3/48 |
| 2017/0303071 A1* | 10/2017 | Haverinen | H04B 17/27 |
| 2018/0024220 A1* | 1/2018 | Massarella | G01S 3/48 |
| | | | 342/417 |
| 2020/0200852 A1 | 6/2020 | Lehtimaki | |
| 2020/0309891 A1 | 10/2020 | Kauppo | |
| 2022/0149977 A1* | 5/2022 | Piirilä | H04K 3/25 |
| 2022/0150705 A1* | 5/2022 | Piirilä | H04W 12/122 |

OTHER PUBLICATIONS

Wu et al., "Two-Dimensional Direction-of-Arrival Estimation for Co-Prime Planar Arrays: A Partial Speclial Search Approach", IEEE Sensors Journal, vol. 16, No. 14, pp. 5660-5670, Jul. 15, 2016.

* cited by examiner

AOX MULTIPATH DETECTION

This disclosure describes systems and methods for detecting that AoX signals have been reflected from one or more objects.

BACKGROUND

Angle of Arrival and Angle of Departure algorithms, collectively referred to as AoX algorithms, typically operate by determining a phase difference between different antenna elements in an antenna array. This phase difference can be used to determine the angle from which the signal originated, since the distance between antenna elements is known.

Specifically, assume the distance between two adjacent antenna elements is d. The phase difference between when the incoming signal is detected at these two adjacent antennas can be given as φ. This phase difference, φ, divided by 2π, multiplied by the wavelength, λ, represents the distance between the two antenna elements, as viewed from the signal source. Knowing this difference in the distance that the incoming signal travelled allows the angle of arrival to be calculated. Specifically, the angle of arrival can be given by the difference in the distance that the incoming signal travelled, divided by d represents the cosine of the incoming signal. In other words, the angle of arrival is defined as the arc cosine of (φλ/2π)/d.

One algorithm that is commonly used to determine AoX is referred to as MUSIC. This algorithm generates pseudospectrums from the incoming data and estimates the most likely AoX from these pseudospectrums.

However, these algorithms assume that all of the incoming signals were received directly from the transmitting device. Thus, if the signal from one of these transmitting devices reflected off a surface, such as a wall, the algorithm may calculate an incorrect angle. This phenomenon is referred to as non-line-of-sight. Further, the case where the device receives the same signal via different paths (such as direct and reflected) may be referred to as multipath.

Therefore, it would be beneficial if there were a system and method of detecting that a multipath environment exists. It would also be advantageous if a positioning system used this knowledge to better calculate the spatial position of the device.

SUMMARY

A system and method for detecting a multipath environment is disclosed. A first pseudospectrum based on azimuth angle and elevation angle is created. The result of this first pseudospectrum are used to create a second pseudospectrum based on polarization and field ratio. The sharpness of the results for these two pseudospectrums is determined and may be used to detect whether a multipath environment exists. If a multipath environment is believed to exist, the results from this device are ignored in determining the spatial position of the object.

According to one embodiment, a method of determining a spatial position of a device is disclosed. The method comprises emitting a signal from the device; receiving the signal by a plurality of locator devices, each at a known location; calculating, for each of the plurality of locator devices, an angle of arrival of the signal, and at least one goodness value associated with the angle of arrival; and using at least two of the calculated angles of arrival and goodness values to determine the spatial position of the device. In certain embodiments, a first pseudospectrum is calculated for each of the plurality of locator devices based on the signal to determine the angle of arrival, and the angle of arrival is used to calculate a second pseudospectrum for each of the plurality of locator devices to determine the polarization ratio and polarization angle. In some embodiments, a first goodness value for the first pseudospectrum and a second goodness value for the second pseudospectrum are calculated for each of the locator devices. In some embodiments, the first goodness value and the second goodness value are combined to create a combined goodness value and the combined goodness value is used to determine the spatial position of the device. In certain embodiments, the first goodness value and the second goodness value are used to determine the spatial position of the device. In some embodiments, a particle filter is applied to the first pseudospectrum to calculate the first goodness value and a particle filter is applied to the second pseudospectrum to calculate the second goodness value. In certain embodiments, all points within a predetermined percentage of a peak value of the first pseudospectrum are considered part of a first peak region, wherein an area of the first peak region is used to calculate the first goodness value; and all points within a predetermined percentage of a peak value of the second pseudospectrum are considered part of a second peak region and an area of the second peak region are used to calculate the second goodness value. In some embodiments, if the at least one goodness value for a first locator device is not within a predetermined range, the angle of arrival calculated for the first locator device is not used to determine the spatial position of the device. In certain embodiments, an intersection point is calculated for each pair of locator devices, based on the known location of each locator device and the angle of arrival calculated for each locator device; and the spatial position of the device is calculated as a weighted average of the intersection points. In some embodiments, the at least one goodness value for a first locator device is used to assign a weight to the intersection points associated with the first locator device. In a further embodiment, if the at least one goodness value for the first locator device is outside a predetermined range, the weight assigned is set to 0. In certain embodiments, a subset of the calculated angles of arrival, less than the plurality of calculated angles of arrival, are used to determine the spatial position of the device, wherein the subset is selected based on the at least one goodness value, such that only the calculated angles of arrival deemed to be most accurate are used to determine the spatial position of the device.

According to another embodiment, a system for determining a spatial position of a device is disclosed. The system comprises a device, comprising a network interface having an antenna to emit a signal comprising a constant tone; a plurality of locator devices each at a known location, each locator device comprising a network interface and an antenna array; a processing unit and a memory device, wherein each locator device receives the signal, generates an I and Q signal for each antenna element in the antenna array, and wherein the I and Q signals are used to calculate an angle of arrival and at least one goodness value; and a computational device to use at least two of the calculated angles of arrival and goodness values to determine the spatial position of the device. In certain embodiments, each locator device calculates the angle of arrival and the at least one goodness value. In some embodiments, the locator devices transmit the I and Q signals to the computational device and the computational device calculates the angle of arrival and the at least one goodness value for each locator device based on the I and Q signals. In some embodiments, the computational device comprises a gateway or a cloud computer. In certain embodiments, a first pseudospectrum is calculated for each of the plurality of locator devices based on the signal to determine the angle of arrival, and wherein the angle of arrival is used to calculate a second pseudospectrum for each of the plurality of locator devices to determine the polarization ratio and polarization angle; and a first goodness value for the first pseudospectrum and a second goodness value for the second pseudospectrum are calculated for each of the locator devices. In some embodiments, if the at least one goodness value for a first locator device is not within a predetermined range, the angle of arrival calculated for the first locator device is not used by the computational device to determine the spatial position of the device. In certain embodiments, an intersection point is calculated by the computational device for each pair of locator devices, based on the known location of each locator device and the angle of arrival calculated for each locator device; and the spatial position of the device is calculated by the computational device as a weighted average of the intersection points. In some embodiments, a subset of the calculated angles of arrival, less than the plurality of calculated angles of arrival, are used by the computational device to determine the spatial position of the device, wherein the subset is selected based on the at least one goodness value, such that only the calculated angles of arrival deemed to be most accurate are used to determine the spatial position of the device.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
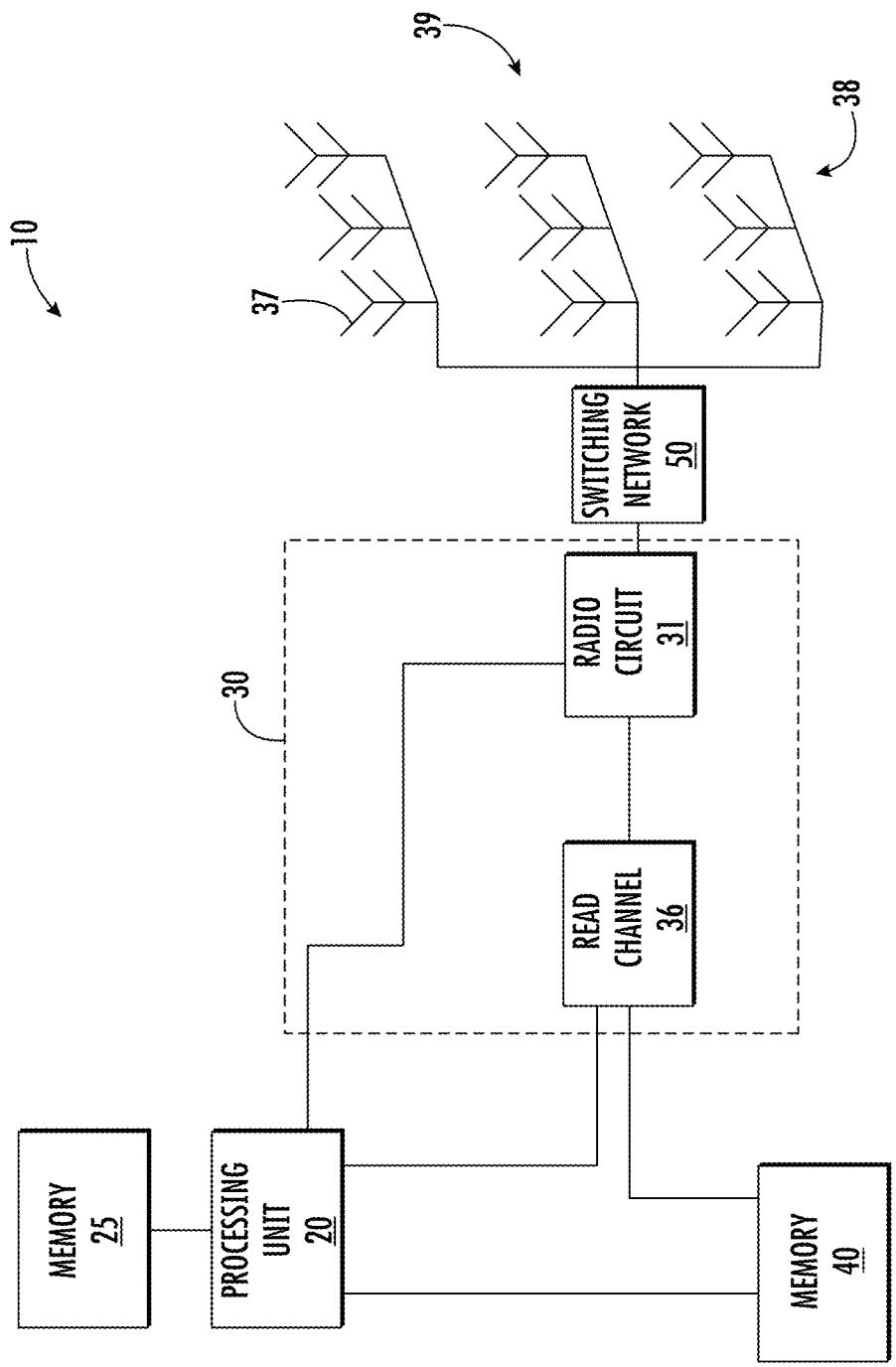
FIG. 1 is a block diagram of a network device that may be used to perform the method described herein.

FIG. 1 shows a network device that may be used to perform the multipath detection described herein. The network device 10 has a processing unit 20 and an associated memory device 25. The processing unit 20 may be any suitable component, such as a microprocessor, embedded processor, an application specific circuit, a programmable circuit, a microcontroller, or another similar device. The memory device 25 contains the instructions, which, when executed by the processing unit 20, enable the network device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM. The instructions contained within the memory device 25 may be referred to as a software program, which is disposed on a non-transitory storage media.

The network device 10 also includes a network interface 30, which may be a wireless network interface that includes an antenna array 38. The network interface 30 may support any wireless network protocol that supports AoX determination, such as Bluetooth. The network interface 30 is used to allow the network device 10 to communicate with other devices disposed on the network 39.

Disposed between the antenna array 38 and the network interface 30 may be a switching network 50, which is used to select one of the antenna elements 37 of the antenna array 38 to be in communication with the network interface.

The network interface 30 include radio circuit 31. This radio circuit 31 is used to process the incoming signal and convert the wireless signals to digital signals. The components within the radio circuit 31 are described in more detail below.

The network interface 30 also includes a read channel 36. The read channel 36 is used to receive, synchronize and decode the digital signals received from the radio circuit 31. Specifically, the read channel 36 has a preamble detector that is used to identify the start of an incoming packet. The read channel 36 also has a sync detector, which is used to identify a particular sequence of bits that are referred to as a sync character. Additionally, the read channel 36 has a decoder which is used to convert the digital signals into properly aligned bytes of data.

The network device 10 may include a second memory device 40. Data that is received from the network interface 30 or is to be sent via the network interface 30 may also be stored in the second memory device 40. This second memory device 40 is traditionally a volatile memory.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language, which is not limited by this disclosure. Thus, in some embodiments, there may be multiple computer readable non-transitory media that contain the instructions described herein. The first computer readable non-transitory media may be in communication with the processing unit 20, as shown in FIG. 1. The second computer readable non-transitory media may be a CDROM, or a different memory device, which is located remote from the network device 10. The instructions contained on this second computer readable non-transitory media may be downloaded onto the memory device 25 to allow execution of the instructions by the network device 10.

While the processing unit 20, the memory device 25, the network interface 30 and the second memory device 40 are shown in FIG. 1 as separate components, it is understood that some or all of these components may be integrated into a single electronic component. Rather, FIG. 1 is used to illustrate the functionality of the network device 10, not its physical configuration.

Although not shown, the network device 10 also has a power supply, which may be a battery or a connection to a permanent power source, such as a wall outlet.

Figure 2:
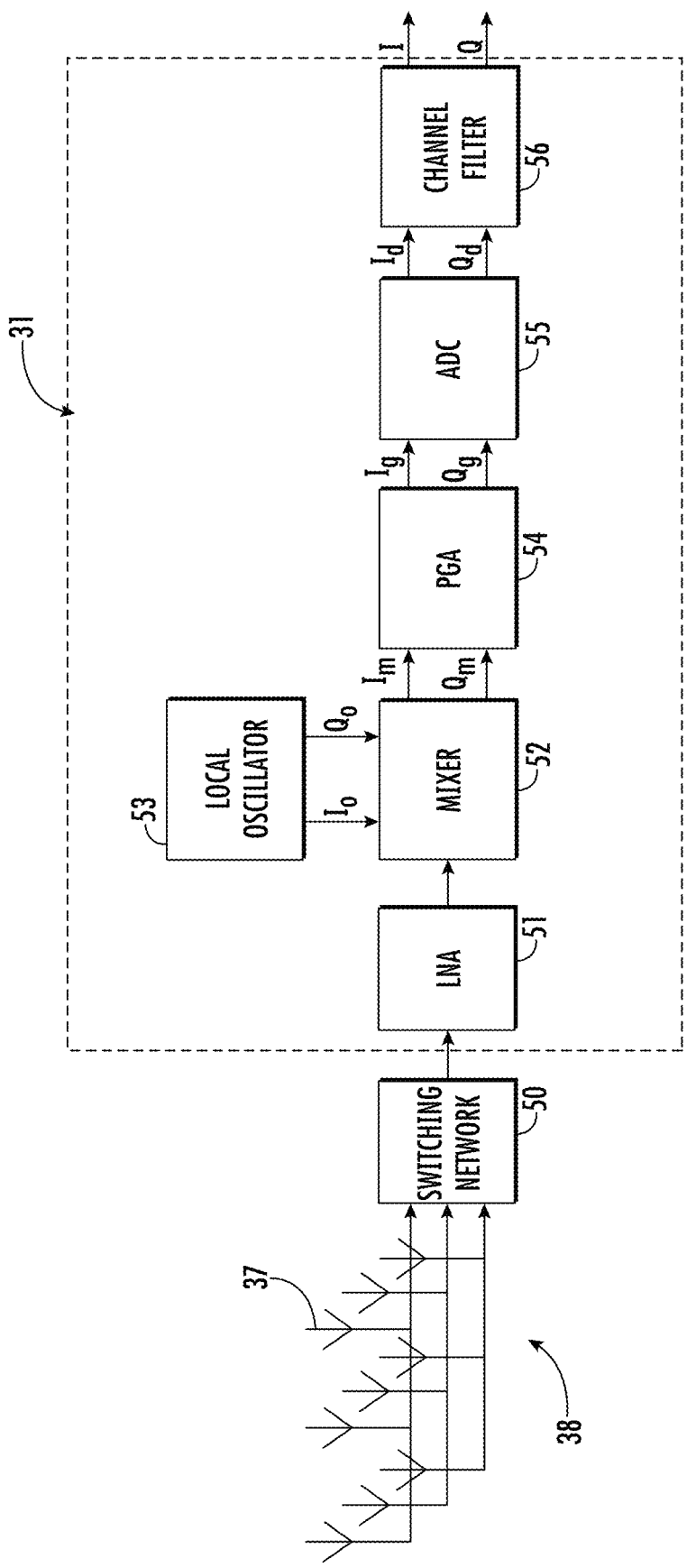
FIG. 2 is a block diagram of the radio receiver of the network device of FIG. 1.

FIG. 2 shows a block diagram of the radio circuit 31. The wireless signals first enter the radio circuit 31 through one antenna element 37 of the antenna array 38. The switching network 50 may be used to select one antenna element 37 from the antenna array 38. Once selected, this antenna element 37 is in electrical communication with a low noise amplifier (LNA) 51. The LNA 51 receives a very weak signal from the antenna element 37 and amplifies that signal while maintaining the signal-to-noise ratio (SNR) of the incoming signal. The amplified signal is then passed to a mixer 52. The mixer 52 is also in communication with a local oscillator 53, which provides two phases to the mixer 52. The cosine of the frequency may be referred to as $I_o$, while the sin of the frequency may be referred to as $Q_o$. The $I_o$ signal is then multiplied by the incoming signal to create the inphase signal, $I_m$. The $Q_o$ signal is then multiplied by a 90° delayed version of the incoming signal to create the quadrature signal, $Q_m$. The inphase signal, $I_m$, and the quadrature signal, $Q_m$, from the mixer 52 are then fed into programmable gain amplifier (PGA) 54. The PGA 54 amplifies the $I_m$ and $Q_m$ signals by a programmable amount. These amplified signals are referred to as $I_g$ and $Q_g$. The amplified signals, $I_g$ and $Q_g$, are then fed from the PGA 54 into an analog to digital converter (ADC) 55. The ADC 55 converts these analog signals to digital signals, $I_d$ and $Q_d$. These digital signals may pass through channel filter 56 then exit the radio circuit 31 as I and Q. In certain embodiments, the I and Q values maybe considered complex numbers, wherein the I value is the real component and the Q value is the imaginary component.

The I and Q signals then enter a CORDIC (Coordination Rotation Digital Computer), which determines the amplitude and phase of the signals. Amplitude is given as the square root of $I^2$ and $Q^2$, while phase is given by the $\tan^{-1}$ (Q/I). The CORDIC may be disposed in the radio circuit 31, or elsewhere within the network interface 30.

Figure 3A:
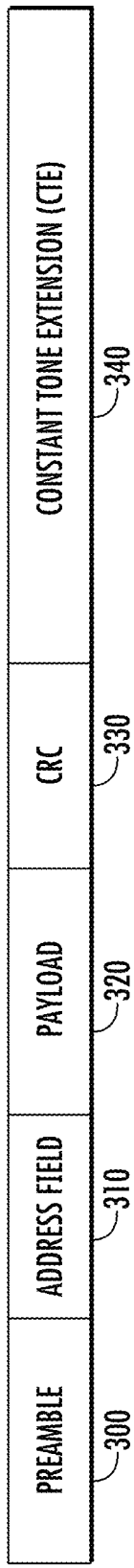
FIG. 3A-3C shows the format of a representative direction detection message transmitted to the system of FIG. 1.
Figure 3B:
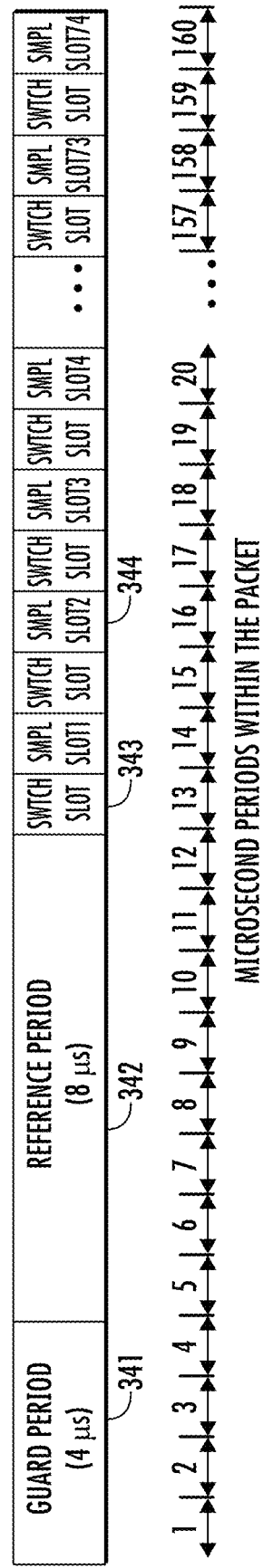
Figure 3C:
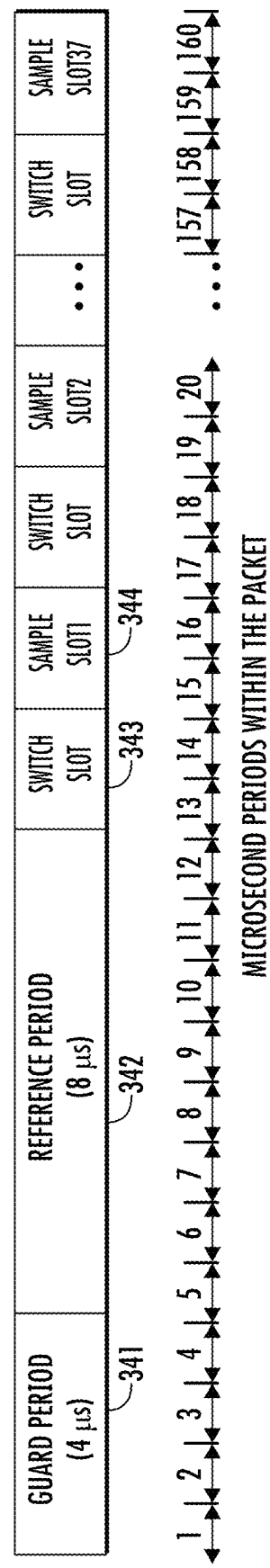

In certain embodiments, the network interface 30 operates on a wireless network that utilizes the Bluetooth network protocol. FIG. 3A shows the format of a special Bluetooth packet that is used for direction detection. These packets typically begin with a preamble 300, an address field 310, a payload 320 and a checksum or CRC 330. However, the special packets also include a constant tone extension (CTE) 340. FIGS. 3B and 3C show two different formats for the CTE 340. In both formats, the CTE 340 includes a guard period 341, a reference period 342, and a plurality of switch slots 343 and sample slots 344. The duration of each switch slot 343 and sample slot 344 may be 1 μsec or 2 μsec, as shown in FIGS. 3B and 3C, respectively. The CTE 340 is a special extension to the Bluetooth packet that transmits a constant frequency, such as a 250 kHz tone. For example, the CTE 340 may be a string of consecutive "1"'s. The CTE 340 may be as long as 160 μsec and as short as 16 μsec. In practice, the network device 10 may use a single antenna element 37 of the antenna array 38 to receive the CTE 340 during the guard period 341 and the reference period 342. The device utilizes the signal received during the guard period 341 and the reference period 342 to set the gain (AGC) and frequency (AFC) of the radio circuit 31. The gain and frequency determinations by the radio circuit 31 may be more accurate if a circularly polarized signal from the antenna element 37 is used during the guard period 341 and the reference period 342.

The network device 10 then switches to another antenna element 37 during each switch slot 343 by changing the selection of the switching network 50 in the radio circuit 31. The network device 10 samples the tone again with that new antenna element 37 during the sample slot 344. The network device 10 continues switching the antenna element 37 during each switch slot 343 and sampling the tone during the sample slot 344. If there are more switch slots 343 than antenna elements, the network device 10 returns to the first antenna element 37 and repeats the sequence.

During the entirety of the CTE 340, the sending device is transmitting a tone at a constant known frequency. As stated above, the network device 10 may receive that tone using one antenna element 37 of the antenna array. Specifically, the guard period 341 and the reference period 342, which have a combined duration of 12 μsec, may be received using the same antenna element 37.

In some embodiments, it has been found that the accuracy of AoX algorithms is improved when the radio circuit 31 utilizes the horizontal and vertical polarized signals from each antenna. Thus, the radio circuit 31 selects each antenna during at least two different sample slots 344; one to receive the horizontally polarized signal, and one to receive the vertically polarized signal.

Thus, in summary, to optimize the accuracy of the AoX algorithm, it may be beneficial to sample each antenna element 37 during at least two sample slots 344, such that the horizontally polarized and vertically polarized signals from each antenna are used as part of the AoX algorithm.

Thus, after receipt of the CTE 340, the network device 10 may have generated I and Q signals for each polarization of each antenna element 37 in the antenna array 38.

Using these I and Q signals, an indication of the elevation angle and azimuth angle of the incoming signals can be determined. Further, advantageously, the confidence in that determination may also be calculated.

Figure 4:
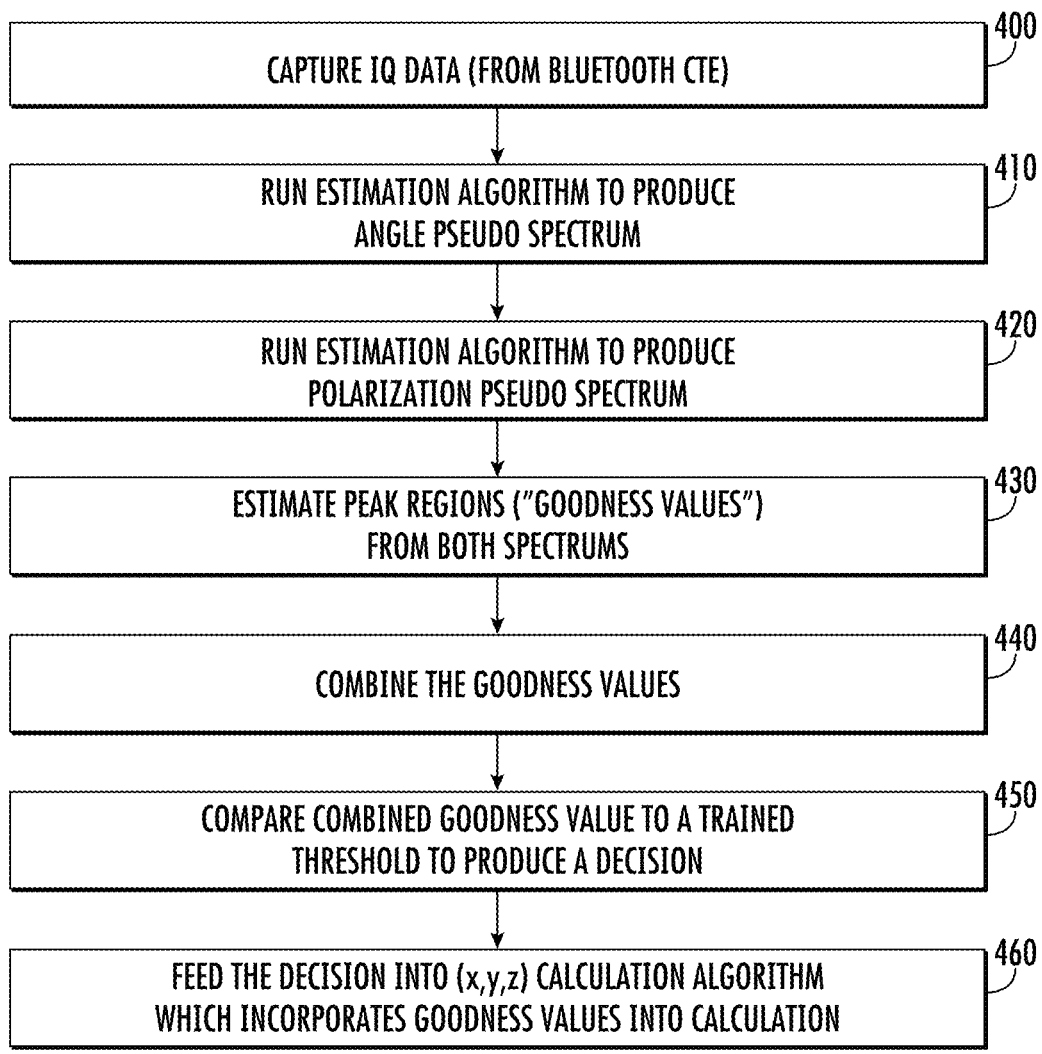
FIG. 4 illustrates a flowchart for determining whether a multipath environment exists.

A process to perform these operations is shown in FIG. 4. First, as explained above and shown in Box 400, the I and Q values are generated.

Then, as shown in Box 410, these I and Q values may be used to create a pseudospectrum using a AoA algorithm, such as MUSIC. As is well known, the MUSIC algorithm generates a pseudospectrum that includes a value for each azimuth and elevation angle over a range of angles. The value associated with each combination of azimuth and elevation angle is indicative of the likelihood that the incoming signal arrived from that combination of azimuth and elevation angle. Throughout this disclosure, this is referred to as the first pseudospectrum.

The antenna configuration is used to form a manifold matrix, referred to as the a(θ,φ) matrix, which is a column vector of dimension (X*Y)×1 where X and Y are the number of antenna elements in each dimension of the antenna array. The a matrix is created using:

Gain ($G_a$) calculated at each azimuth angle (θ) of interest;
Phase ($P_a$) calculated at each azimuth angle (θ) of interest;
Gain ($G_e$) calculated at each elevation angle (φ) of interest; and
Phase ($P_e$) calculated at each elevation angle (φ) of interest.

The covariance of the I and Q values are used to form a matrix (R). Specifically, the I and Q samples are used to form a matrix, referred to as the x matrix, of dimension (X*Y)×Z, where Z is the number of snapshots per antenna element. The x matrix and its Hermitian transpose ($x^H$) are then used to create the R matrix. The eigenvalues of this matrix, R, are then computed to create the matrix RN. In one embodiment, eigen deconstruction of R is performed to yield: $R=VAV^{-1}$, where A is a diagonal matrix containing the eigenvalues, V contains the corresponding eigenvectors, and $V^{-1}$ is the inverse matrix of V. If there are N eigenvectors, the (N−m) eigenvectors which correspond to the (N−m) smallest eigenvalues are selected, where m may be 1. This set of eigenvectors, which now forms a (N−m)×N matrix may be referred to as Vm. RN is then computed as RN=Vm× Vm$^H$, where Vm$^H$ is the Hermitian transpose of Vm. The first pseudospectrum may be calculated as PS$_1$=1/a$^H$(θ,φ) *Vm*Vm$^H$*a(θ,φ).

Figure 5A:
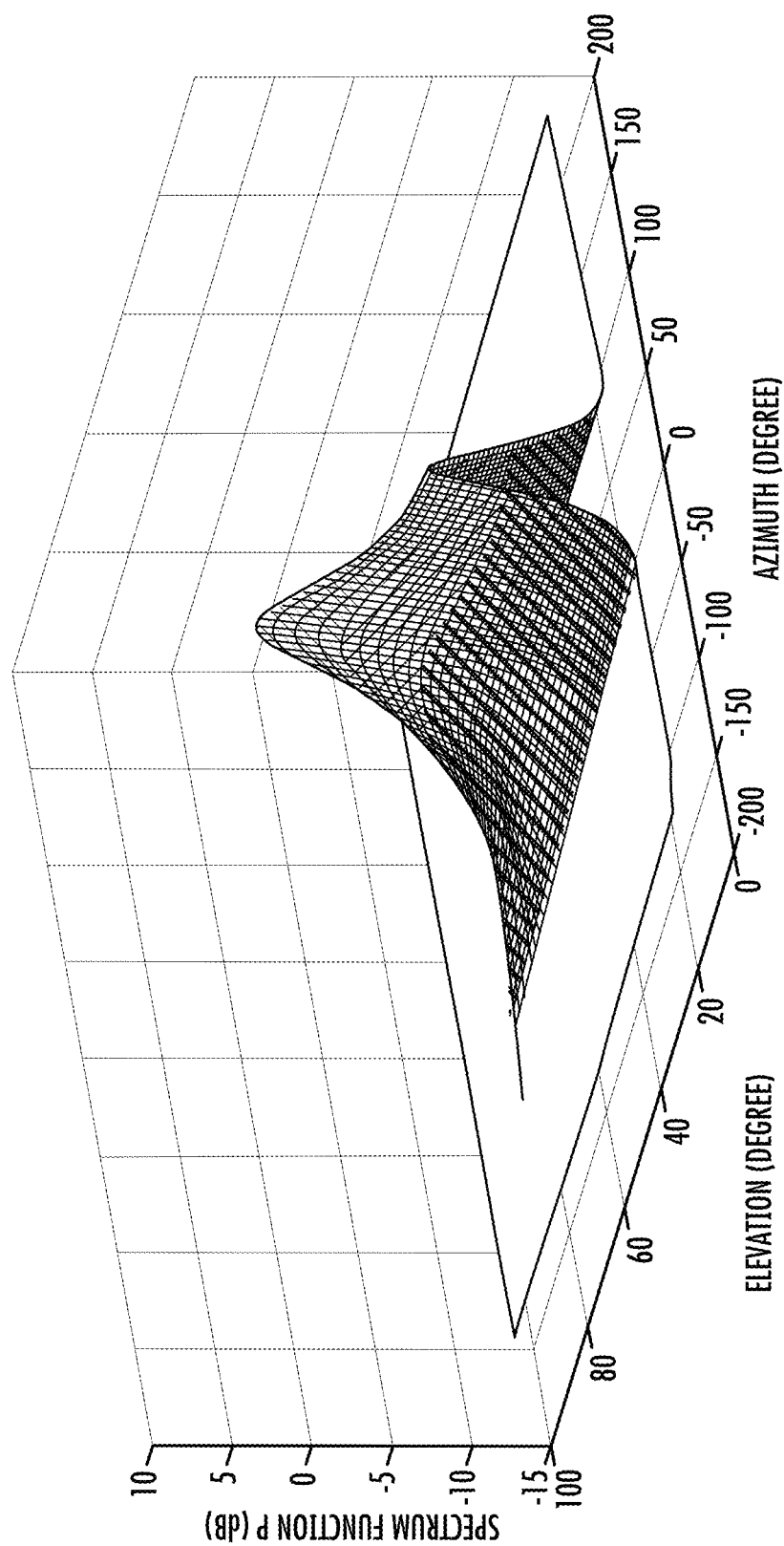
FIGS. 5A-5B show the first pseudospectrum represented in two different ways.

FIG. 5A shows a representative 3-dimensional pseudospectrum that was created using the MUSIC algorithm. Note that this first pseudospectrum indicates that the incoming signals arrived from azimuth angle of −2° and an elevation angle of 26°. This set of angles represents the peak in FIG. 5A Next, as shown in Box 420, a second pseudospectrum is generated. This second pseudospectrum utilizes the ratio of the strengths of the electric fields in the azimuth and elevation directions, as well as the angle between these two fields. For example, an angle of 0° indicates linear polarization, while an angle of 90° with a ratio of 1 indicates circular polarization. Any other ratio indicates elliptical polarization.

In practice, the angle of arrival is based on elevation angle (φ), azimuth angle (θ), the ratio of the strength of electric fields (φ also referred to as the polarization ratio, and the angle between these electric fields (α), also referred to as the polarization angle. In other words, AoA=PS(φ,θ,ρ,α).

However, to simplify these calculations, AoA may be approximated as follows: AoA=PS$_1$(φ,θ)*PS$_2$(ρ,α)|argmax (φ,θ).

Thus, the actual angle of arrival is approximated by computing the AoA using the first pseudospectrum described above, which yields φ$_{calc}$ and θ$_{calc}$ These two angles are then used in the computation of a second pseudospectrum.

First, to create the second pseudospectrum, the antenna manifold, a(φ,θ,ρ,α), is calculated using the following parameters:

Gain (G$_a$) calculated at the calculated azimuth angle (θ$_{calc}$);
Phase(P$_a$) calculated at the calculated azimuth angle (θ$_{calc}$);
Gain (G$_e$) calculated at the calculated elevation angle (φ$_{calc}$);
Phase (P$_e$) calculated at the calculated elevation angle (φ$_{calc}$);
Polarization Ratio (ρ); and
Polarization Angle (α).

The first four values are constants for a given azimuth and elevation angle combination, and may be determined based on the output from the first pseudospectrum. The last two parameters are scanned between a minimum and maximum value. For example, polarization ratio may be scanned from 0.01 to 100.0, while polarization angle may be between 0° and 360°. Thus, the antenna manifold (S) is represented as a matrix, having a unique value for each polarization ratio and polarization angle.

The covariance of the I and Q values are used to form a matrix (R) as described above. The eigenvalues of this matrix, R, are then computed to create a second matrix (RN). In certain embodiments, the RN matrix calculated with respect to the first pseudospectrum may be utilized to create the second pseudospectrum. This approach reduces computation time, possibly at the expense of memory space. As described above, RN is computed as RN=Vm×Vm$^H$, where Vm$^H$ is the Hermitian transpose of Vm. The antenna manifold, a(φ,θ,ρ,α) is then combined with the Vm matrix to create a second pseudospectrum. For example, the second pseudospectrum, PS$_2$ may be defined as 1/(a*Vm*Vm$^H$*a$^H$), where a$^H$ is the Hermitian transpose of the a(φ,θ,ρ,α) matrix.

Figure 6A:
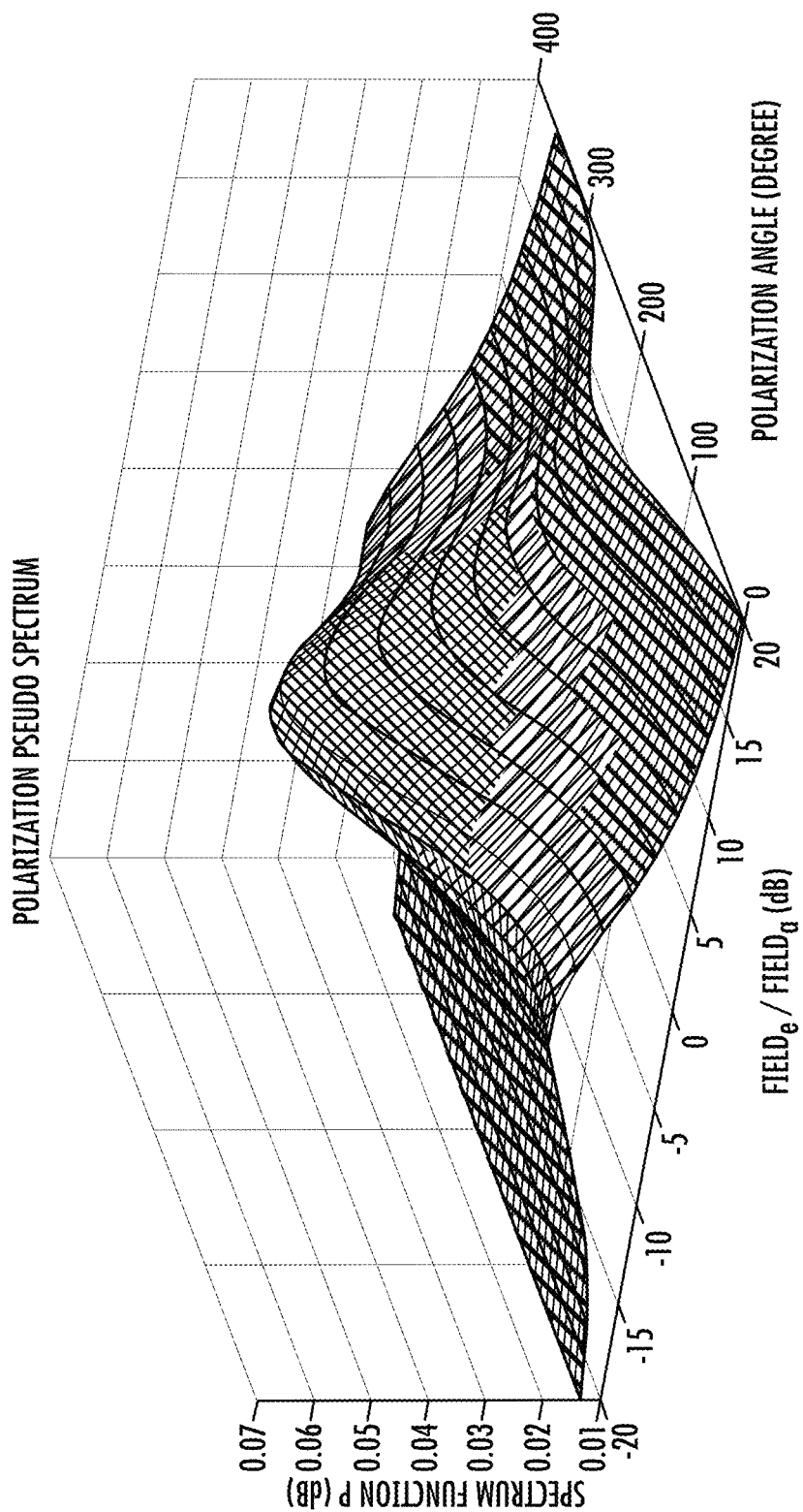
FIGS. 6A-6B show the second pseudospectrum represented in two different ways.

This process yields a second pseudospectrum, a representative illustration of which is shown in FIG. 6A.

Having computed the first and second pseudospectrums, the confidence in the combination of azimuth and elevation angle is then determined, as shown in Box 430.

Figure 5B:
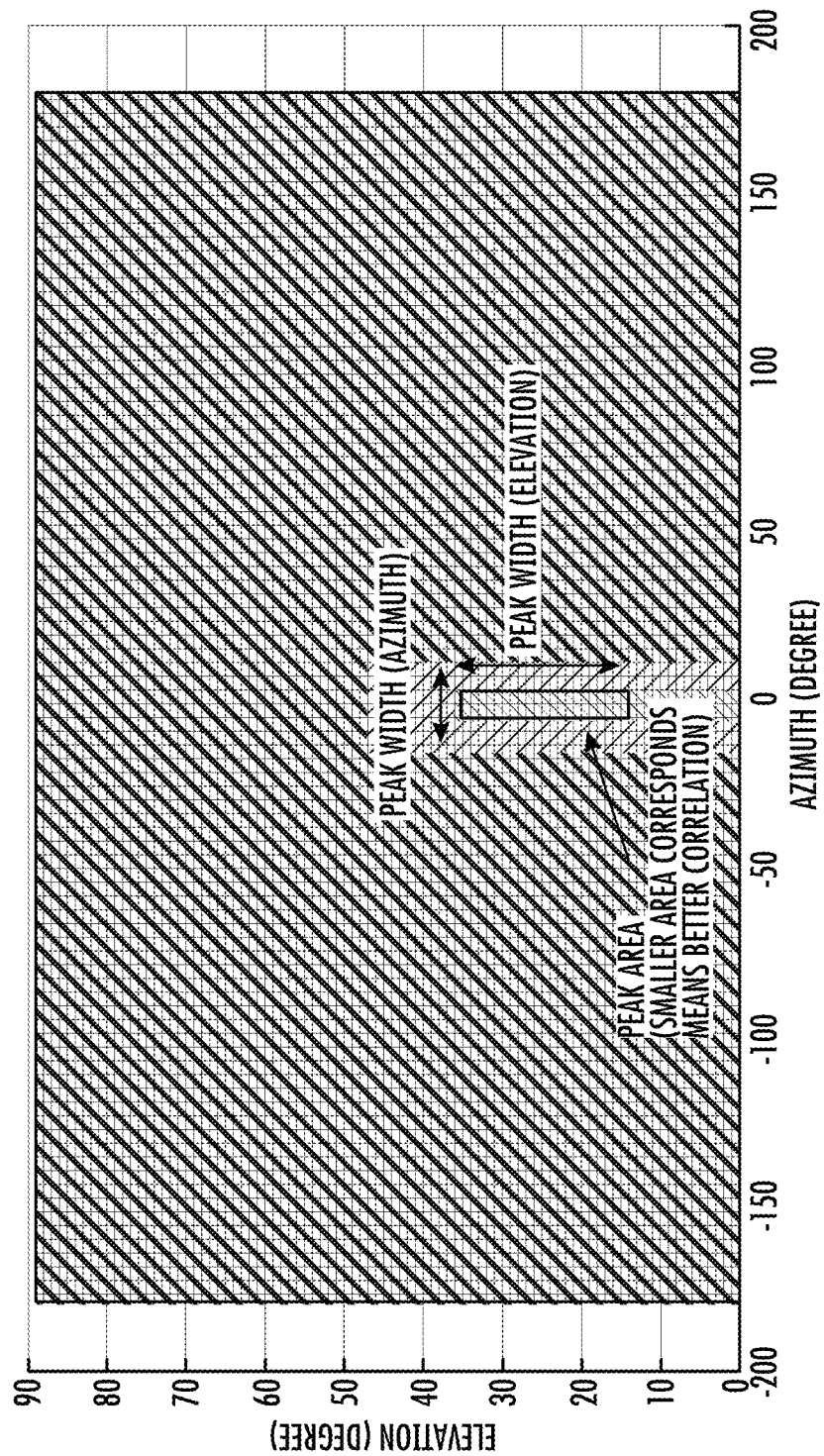

FIG. 5B shows the pseudospectrum of FIG. 5A, represented as a two dimensional array, wherein each value in the array is the value associated with that combination of azimuth and elevation angle shown in FIG. 5A. Note that in this array, a small region proximate the peak has the largest values, and the values decrease rapidly moving away from the peak. This may be indicative of an accurate AoA measurement, since the peak is clearly visible and the values around that peak decrease sharply.

However, it is possible that a pseudospectrum with azimuth and elevation angles has a small peak region, and yet a multipath environment exists. In other words, there are situations where this first pseudospectrum fails to provide sufficient information to determine whether a multipath environment exists.

Figure 6B:
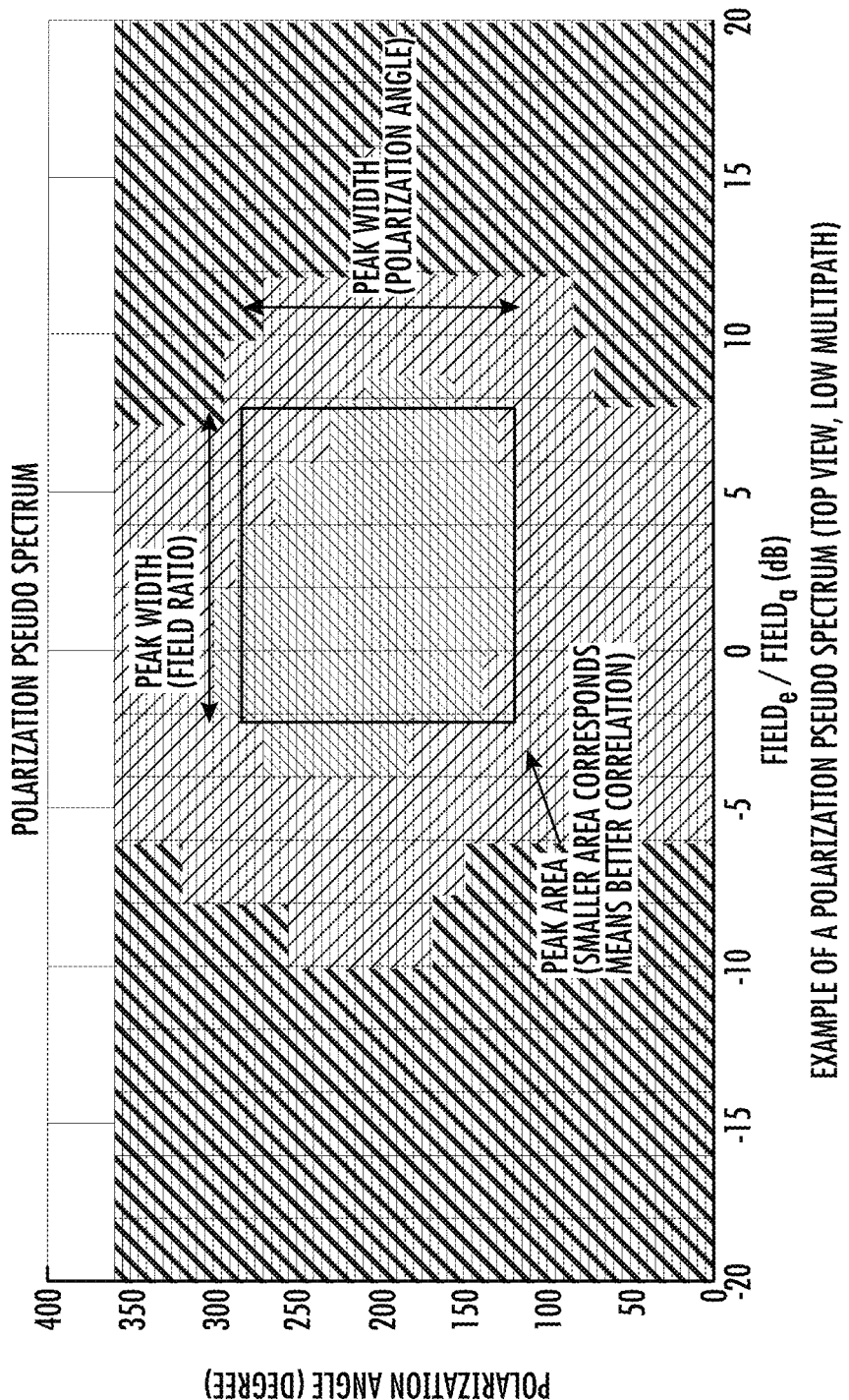

Similarly, FIG. 6B shows the pseudospectrum of FIG. 6A represented as a two dimensional array, wherein each value in the array is the value associated with that combination of polarization ratio and polarization angle shown in FIG. 6A. Note that in this array, a region proximate the peak has the largest values, and the values decrease moving away from the peak. Further, note that this peak region is larger than that shown in FIG. 5B.

To determine the likelihood that the resulting azimuth and elevation angles are accurate, a measure of goodness may be calculated for each peak region, as shown in Box 430.

For example, the peak region may be the area wherein the values within that region are within a certain percentage of the maximum value. For example, FIG. 5B shows a peak region that has a peak width of about 4° in azimuth angle and a peak width of about 21° in elevation angle. Since the pseudospectrum includes 360° in azimuth and 90° in elevation, the peak region is only about 0.26% of the entire pseudospectrum.

Meanwhile, the peak region in FIG. 6B shows a peak region that has a peak width of 10 dB and a peak width of about 150°. Since the pseudospectrum includes 360° in polarization angle and 40 dB in polarization ratio, the peak region is about 10.5% of the entire pseudospectrum. Note that the certainty associated with the second pseudospectrum is much less than that associated with the first pseudospectrum.

Thus, in certain embodiments, the confidence associated with the results of a pseudospectrum, also referred to as the "goodness of the pseudospectrum" may be related to the area of the peak region.

In one embodiment, the peak region is calculated as all points having a value that is within a predetermined percentage of the maximum value. For example, in FIG. 5A, the peak value may be normalized to 0 dB, and all values within 5 dB of that value may be considered part of the peak region. Of course, other values may be used. Alternatively, all values within a certain percentage of the peak value may be considered part of the peak region. The area of the peak region, as a percentage or fraction of the entire pseudospectrum, may be used to calculate the goodness of a pseudospectrum.

Alternatively, other approaches may be used to calculate the goodness of a pseudospectrum. For example, a particle filter may be applied to the pseudospectrums, and the standard deviation of that result may be indicative of the goodness. The particle filter may operate as follows. First, a limited number of "particles" are generated with uniform distribution over the pseudospectrum. At this time, all particles have equal weight.

Next, the weight of each particle is updated based on the corresponding value of the pseudospectrum at the location of the particle. Thus, particles at or near the peak region will have larger weights that other particles.

Next, particles with lower weights are redistributed closer to the particles with higher weights. The redistributed particles are then assigned a new weight, based on their new locations. All particles are then resampled, by placing particles with lower weights close to particles with higher weights.

This may be iterated. The process leads to a situation where all particles are located around the highest peak(s). Next, the standard deviation of this particle cloud is calculated, which is an estimate of the peak width. The particle cloud will be denser in the case of sharp peak and it will lead to lower standard deviation.

Once a goodness value has been calculated for each pseudospectrum, these values can be combined as shown in Box 440. In certain embodiments, these goodness values may be summed together. In other embodiments, the goodness values may be multiplied together. In another embodiment, the two goodness values and optionally other parameters, such as RSSI and channel number, may be fed into a neural network to create a combined goodness value. Of course, other functions may be used to combine the two goodness values. This combined goodness value may be used in many ways.

First, the combined goodness value may be compared to a threshold to determine whether the calculated combination of elevation and azimuth angles are likely to be accurate, as shown in Box 450. An indication that the combination is accurate provides confidence that these values may be used in further calculations. In certain embodiments, the threshold may be adaptive in that it is trained as part of a neural network. In other embodiments, the threshold may be calculated in other ways or may be fixed. In certain embodiments, a weight may be assigned based on the goodness values. Thus, the decision may be to eliminate the combination from further calculations if this goodness value is unacceptable, or to reduce the weight associated with that combination. In all embodiments, the decision is based on the goodness value.

An indication that the combination of angles is incorrect may result in the combination being ignored, or may result in Boxes 400-440 being repeated. In other embodiments, an indication that the combination of angles may be incorrect may result in that combination being given less weight when the spatial position of the tracked device is calculated.

In another embodiment, rather than combining the goodness from the first and second pseudospectrums, the goodness values for each may be compared to two different predetermined thresholds to determine whether the results are believed to be accurate.

The angle of arrival or departure may be used for many functions. For example, a plurality of angle of arrival locator devices can be used to track a device. Each locator device may have the structure shown in FIG. 1. This class of applications is referred to as spatial positioning. For example, inside a structure that has multiple locator devices, the exact location of any transmitter may be determined. This may serve to replace GPS in these environments, as GPS positioning requires more power to execute. In one example, an operator may carry a mobile telephone. The phone may emit the CTE, which is received by each of the plurality of locator devices. The location and orientation of each locator device is known. Based on the received CTE signal, the plurality of locator devices each determine the angle of arrival for a beacon transmitted by this phone by creating both the first pseudospectrum and the second pseudospectrum. In one embodiment, these angles of arrival are forwarded to a centralized computational device 770 (see FIGS. 7A-7B), which calculates the position of the mobile phone or other tracked device based on all of the received angles of arrival. This centralized computational device 770 may be the mobile telephone, one of the locator devices, a gateway device, a cloud computer or another device. In all embodiments, the centralized computational device has a configuration similar to that shown in FIG. 1, but may not include an antenna array. Rather, a single antenna or a wired connection may be used. The centralized computational device 770 includes a memory device that comprises instructions that enable the processing unit within the centralized computational device 770 to perform the operations described herein.

Thus, the angle of arrival from each locator device may be used to pinpoint the specific location of the mobile phone or other tracked device. If a plurality of locator devices are employed, three dimensional spatial positioning of the tracked device is possible.

In this embodiment, the centralized computational device 770 may receive the azimuth and elevation angle from each locator device as well as its combined goodness value or two goodness values.

In other embodiments, a centralized computational device 770 may receive the I and Q values from each of the plurality of locator devices, and calculate the first and second pseudospectrums for each of the locator devices.

In one embodiment, the goodness value or values may be treated using a binary filter, where goodness values deemed to be either acceptable or unacceptable. Thus, in these embodiments, the centralized computational device 770 may disregard azimuth and elevations angles from any locator device which reported a goodness value or values outside a predetermined range.

However, other embodiments are also possible. For example, in another embodiment, the goodness values reported by the various locator devices are sorted according to accuracy. In this embodiment, only the N most accurate results are used to calculate the spatial position, where N is a value of 2 or more. In another embodiment, the top N percentile of goodness values are used.

In both of these scenarios, the centralized computational device 770 utilizes a selected number of azimuth and elevation angles that are believed to be the most accurate. The information from the most accurate locator devices may then be used as follows. The azimuth and elevation angles from each pair of locator devices is then used to determine an intersection point, using simple trigonometry. Thus, if information from N locator devices is used, a total of $N*(N-1)/2$ intersection points will be calculated. The position of the tracked device may be calculated as the average of these intersection points.

In another embodiment, the goodness value may be treated along a continuum, where the value of the goodness value is indicative of its degree of accuracy. In this embodiment, the centralized computational device 770 calculates the intersection point for each pair of locator devices, as described above. However, in this embodiment, each intersection point is assigned a weight based on the goodness values of the locator devices that were used to generate that intersection point, wherein higher weights indicate a more accurate result. Then, the location of the tracked device 700 may be computed as the weighted average of all of the intersection points.

In yet another embodiment, a combination of these approaches may be used, wherein a binary filter is used to eliminate results believed to be inaccurate and the remaining results are weighted according to their perceived accuracy.

Thus, in calculating the actual spatial position of the mobile phone (or other device), the centralized computational device 770 may also utilize the combined goodness values, as shown in Box 460.

Figure 7A:
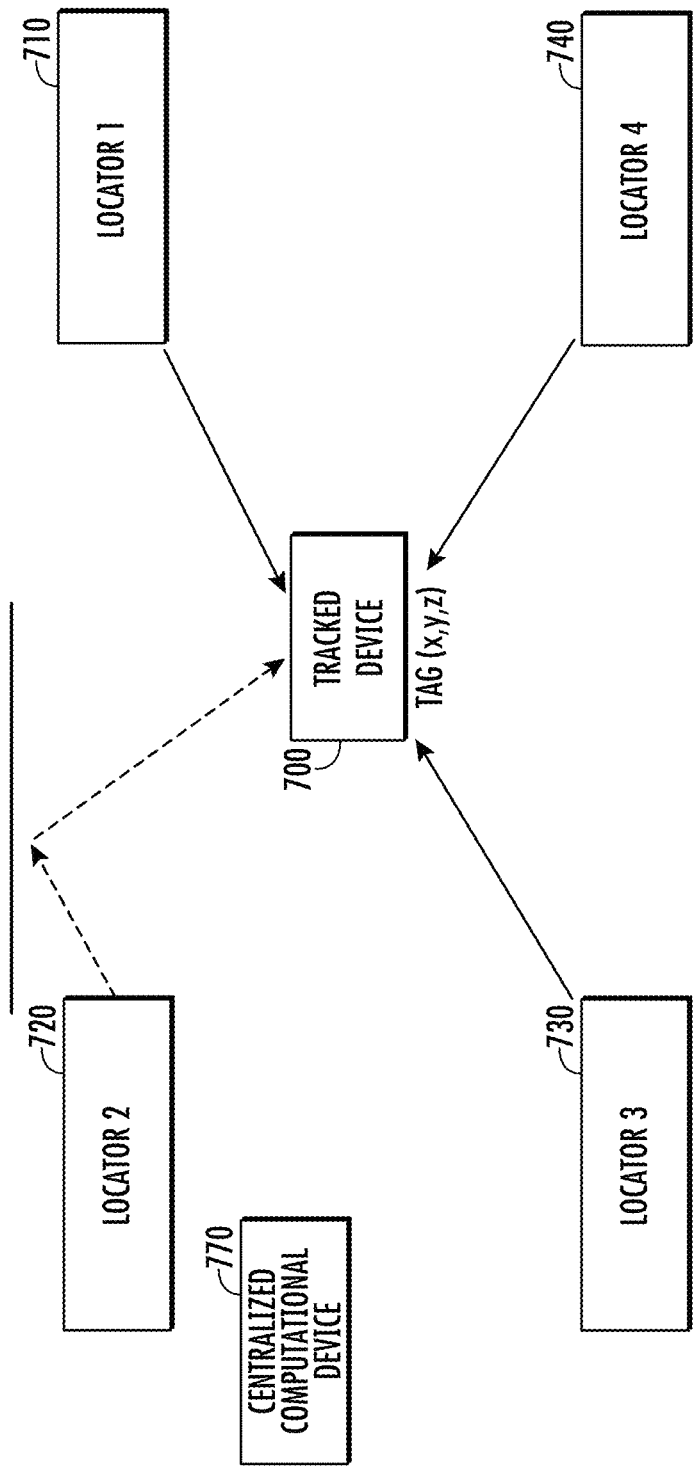
FIG. 7A-7B shows examples where some of the locator devices receive reflected signals.

FIG. 7A shows one embodiment, wherein four locator devices 710, 720, 730, 740 are used to track a device 700. In this figures, locator devices 710, 730 and 740 all have a direct line of sight to the device 700. However, the signals from device 700 are reflected off a wall or other surface before reaching the locator device 720. This reflection may cause the AoA calculations performed by the locator device 720 to be inaccurate, as indicated by the combined goodness value. Thus, in one embodiment, the results from locator device 720 are simply ignored by the centralized computational device 770 in the calculation of the spatial position of the device 700. In another embodiment, the results from locator device 720 are given a much lower weight than the results from other locator devices.

FIG. 7A shows an embodiment where only one locator device 720 generated inaccurate results. In this case, it may be possible to determine that locator device 720 experiences multipath without the use of two pseudospectrums since the intersection points that are generated using locator device 720 do not agree with the intersection points that are generated when only locator devices 720, 730 and 740 are used.

Figure 7B:
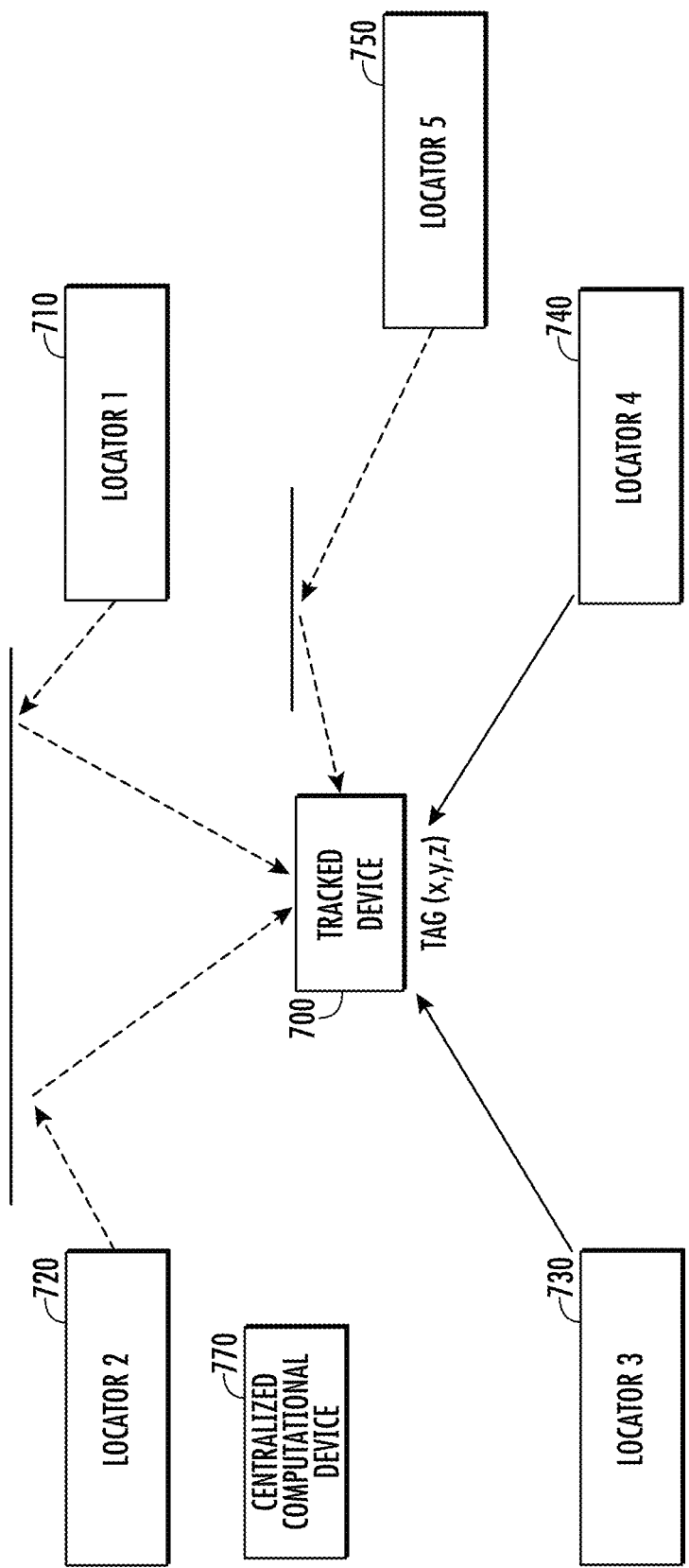

FIG. 7B shows a second embodiment, where three of the five locator devices experience a multipath environment. Specifically, locator devices 710, 720 and 750 all experience multipath environments. In this embodiment, only the intersection point that is generated based on locator devices 730 and 740 is accurate. All other intersection points utilize at least one locator device that experienced a multipath environment. In this embodiment, the only way to correctly identify the spatial position of the tracked device 700 is to be able to identify that only results from locator devices 730 and 740 are accurate. Thus, in this embodiment, the goodness value or values provide this information and allow the centralized computational device 770 to correctly calculate the spatial position of the tracked device 700.

Similar functions can be performed using an angle of departure algorithm. For example, the user may have a device that has a single antenna, rather than an antenna array. If the beacons, such as those described above in the shopping mall or warehouse, utilize an antenna array, the user's device may determine the angle of departure.

The device may also be able to determine the angle of departure from multiple beacons. If the position of the beacons is known, the device (or a centralized computational device) may be able to calculate its spatial position from these angles of departure.

In other words, this information can be used in the same manner as angle of arrival information for spatial positioning.

Figure 8B:
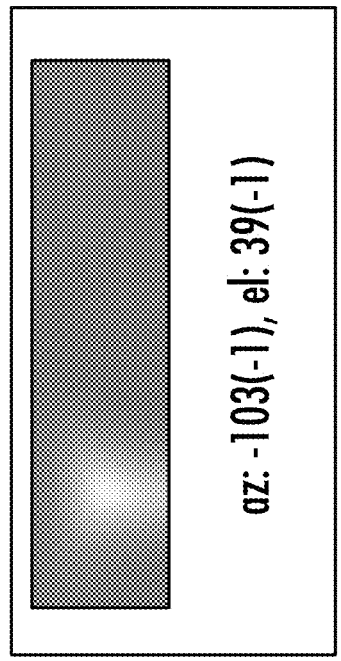
FIGS. 8A-8B show two examples and the associated first and second pseudospectrums.
Figure 8B:
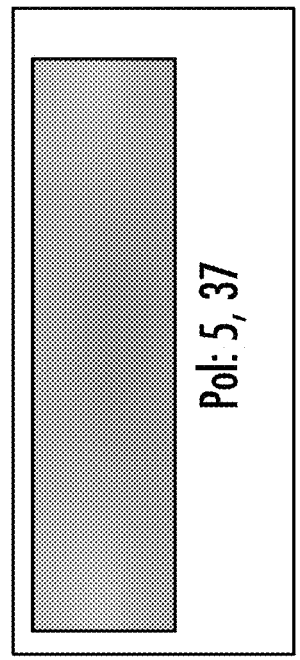
Figure 8A:
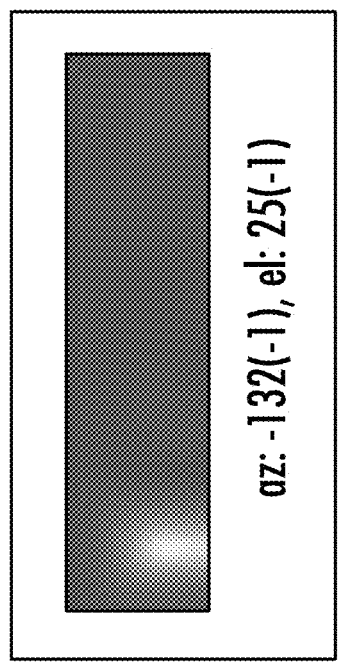
Figure 8A:
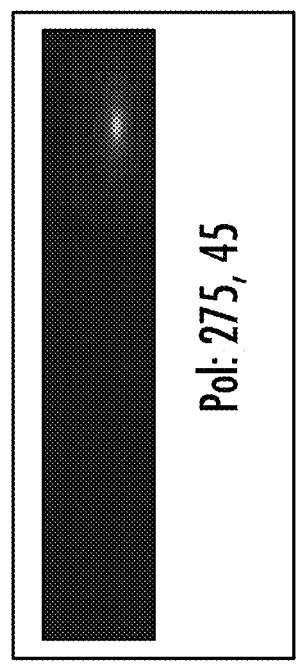

The present system and method have many advantages. This system and method greatly improve the detection of multipath environments, even in cases that were previously not identified. FIG. 8A shows an example where a direct line of sight is present and there is little to no multipath between the device and the locator. Note that there are small peak regions for both the first pseudospectrum and the second pseudospectrum. This is indicative of a calculation that has a great degree of confidence. In contrast, FIG. 8B shows an example where a multipath environment may exist, but is not detected by the first pseudospectrum. Note that there is a relatively small peak region on the first pseudospectrum, which seems to suggest that the result is accurate. However, the second pseudospectrum has a large peak region. Thus, the second pseudospectrum provides the necessary information to determine that the results of the first pseudospectrum were not accurate. Thus, these results may not be used by a centralized computational device, thereby improving the accuracy of the spatial positioning computation.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of determining a spatial position of a device, comprising:
   emitting a signal from the device;
   receiving the signal by a plurality of locator devices, each at a known location;
   calculating, for each of the plurality of locator devices, an angle of arrival of the signal, and at least one goodness value associated with the angle of arrival; and
   using a computational device to receive information from the plurality of locator devices, wherein the computation device uses at least two of the calculated angles of arrival and goodness values to determine the spatial position of the device,
   wherein a first pseudospectrum is calculated for each of the plurality of locator devices based on the signal to determine the angle of arrival, and wherein the angle of arrival is used to calculate a second pseudospectrum for each of the plurality of locator devices to determine a polarization ratio and polarization angle, and wherein the first pseudospectrum and the second pseudospectrum are used to generate the at least one goodness value for each of the plurality of locator devices.

2. The method of claim 1, wherein a first goodness value for the first pseudospectrum and a second goodness value for the second pseudospectrum are calculated for each of the locator devices.

3. The method of claim 2, wherein the first goodness value and the second goodness value are combined to create a combined goodness value and the combined goodness value is used to determine the spatial position of the device.

4. The method of claim 2, wherein the first goodness value and the second goodness value are used to determine the spatial position of the device.

5. The method of claim 2, wherein a particle filter is applied to the first pseudospectrum to calculate the first goodness value and a particle filter is applied to the second pseudospectrum to calculate the second goodness value.

6. The method of claim 2, wherein all points within a predetermined percentage of a peak value of the first pseudospectrum are considered part of a first peak region, wherein an area of the first peak region is used to calculate the first goodness value; and wherein all points within a predetermined percentage of a peak value of the second pseudospectrum are considered part of a second peak region and an area of the second peak region are used to calculate the second goodness value.

7. The method of claim 1, wherein, if the at least one goodness value for a first locator device is not within a predetermined range, the angle of arrival calculated for the first locator device is not used to determine the spatial position of the device.

8. The method of claim 1, wherein an intersection point is calculated for each pair of locator devices, based on the known location of each locator device and the angle of arrival calculated for each locator device; and wherein the spatial position of the device is calculated as a weighted average of the intersection points.

9. The method of claim 8, wherein the at least one goodness value for a first locator device is used to assign a weight to the intersection points associated with the first locator device.

10. The method of claim 9, wherein, if the at least one goodness value for the first locator device is outside a predetermined range, the weight assigned is set to 0.

11. The method of claim 1, wherein a subset of the calculated angles of arrival, less than the plurality of calculated angles of arrival, are used to determine the spatial position of the device, wherein the subset is selected based on the at least one goodness value, such that only the calculated angles of arrival deemed to be most accurate are used to determine the spatial position of the device.

12. A system for determining a spatial position of a device, comprising:
a device, comprising a network interface having an antenna to emit a signal comprising a constant tone;
a plurality of locator devices each at a known location, each locator device comprising a network interface and an antenna array; a processing unit and a memory device, wherein each locator device receives the signal, generates an I and Q signal for each antenna element in the antenna array, and wherein the I and Q signals are used to calculate an angle of arrival and at least one goodness value; and
a computational device, wherein the computational device receives information from the plurality of locator devices and uses at least two of the calculated angles of arrival and goodness values to determine the spatial position of the device,
wherein a first pseudospectrum is calculated for each of the plurality of locator devices based on the I and Q signals to determine the angle of arrival, and wherein the angle of arrival is used to calculate a second pseudospectrum for each of the plurality of locator devices to determine a polarization ratio and polarization angle, and wherein the first pseudospectrum and the second pseudospectrum are used to generate the at least one goodness value for each of the plurality of locator devices.

13. The system of claim 12, wherein each locator device calculates the angle of arrival and the at least one goodness value, and transmits the angle of arrival and the at least one goodness value to the computational device.

14. The system of claim 12, wherein the locator devices transmit the I and Q signals to the computational device and the computational device calculates the angle of arrival and the at least one goodness value for each locator device based on the I and Q signals.

15. The system of claim 12, wherein the computational device comprises a gateway or a cloud computer.

16. The system of claim 12, wherein a first goodness value for the first pseudospectrum and a second goodness value for the second pseudospectrum are calculated for each of the locator devices.

17. The system of claim 12, wherein, if the at least one goodness value for a first locator device is not within a predetermined range, the angle of arrival calculated for the first locator device is not used by the computational device to determine the spatial position of the device.

18. The system of claim 17, wherein an intersection point is calculated by the computational device for each pair of locator devices, based on the known location of each locator device and the angle of arrival calculated for each locator device; and wherein the spatial position of the device is calculated by the computational device as a weighted average of the intersection points.

19. The system of claim 12, wherein a subset of the calculated angles of arrival, less than the plurality of calculated angles of arrival, are used by the computational device to determine the spatial position of the device, wherein the subset is selected based on the at least one goodness value, such that only the calculated angles of arrival deemed to be most accurate are used to determine the spatial position of the device.

* * * * *